June 11, 1968   R. A. BROWN   3,388,388
CUMULATIVE DIGITAL PULSE REMOTE METER READING
Filed Oct. 24, 1965   3 Sheets-Sheet 1
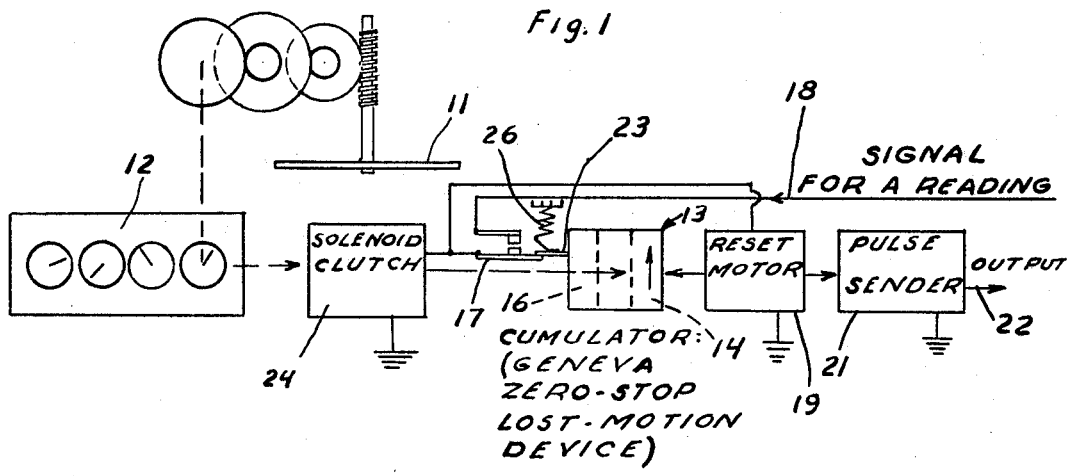
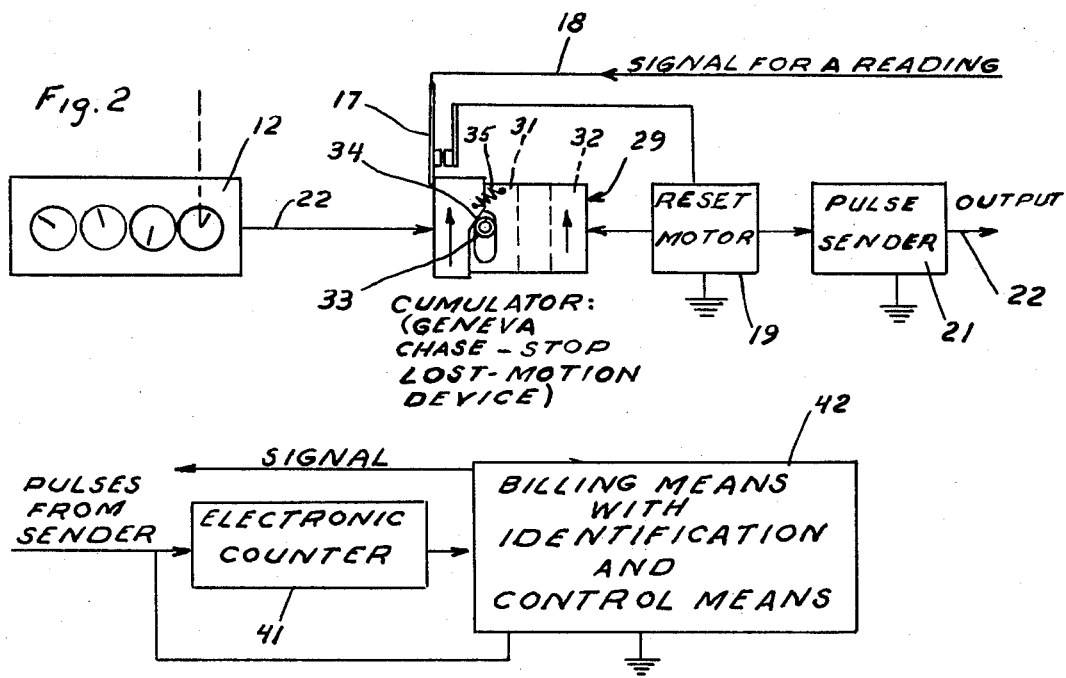
ROBERT A. BROWN
INVENTOR.
BY
Darbo, Robertson & Vandenburgh June 11, 1968 R. A. BROWN 3,388,388
CUMULATIVE DIGITAL PULSE REMOTE METER READING
Filed Oct. 24, 1965 3 Sheets-Sheet 2

INVENTOR:
ROBERT A. BROWN
BY
Darbo, Robertson & Vandenburgh

June 11, 1968 R. A. BROWN 3,388,388
CUMULATIVE DIGITAL PULSE REMOTE METER READING
Filed Oct. 24, 1965 3 Sheets-Sheet 3

ROBERT A. BROWN
INVENTOR.

BY
Darbo, Robertson & Vandenburgh

United States Patent Office 3,388,388
Patented June 11, 1968

3,388,388
CUMULATIVE DIGITAL PULSE REMOTE
METER READING
Robert A. Brown, Lafayette, Ind., assignor to Duncan
Electric Company, Inc., a corporation of Indiana
Filed Oct. 24, 1965, Ser. No. 505,073
12 Claims. (Cl. 340—203)

The invention, of which this disclosure is offered for public dissemination in the event that adequate patent protection is granted, relates to the reading of meters from a remote centralized location.

There has long been recognition that the old method of meter reading, having a man go from house to house, is costly and unsatisfactory. There have already been many proposals and some experimenting toward remote centralized meter reading. Most of the systems involve a very complex means for translating the positions of the various pointers of the meter register into coded signals which are transmitted to the central station.

According to the present invention, the need for this basic component is avoided by using a resettable cumulator which is driven from a zero condition in accordance with meter measurement, and a resetting motor coupled to an impulse sender which merely transmits signals in the form of simple digital pulses showing the amount of resetting motion required to restore the cumulator to its zero condition. After such restoration at one meter reading, the advancing element of the cumulator is driven forwardly by the meter with which it is associated, so that the amount of forward movement is proportional to the accumulated meter measurement (or the use of electrical energy, gas or water) during the period.

Then from the central location, a signal is sent to cause a "reading." This signal starts a reset motor which drives the cumulator to restore it to zero condition. According to the design this restoration may be either by driving back the advance element or by driving forward the zero element. When the amount of driving required has been signaled to the central reading station by the impulse sender the zero condition of the cumulator is reached, and both the reset motor and the pulse sender stop. The cumulator is thus in position to start accumulating the amount of the measurement by the meter until the next centralized meter reading.

This method of remote reading also permits simplified central station equipment or operations, inasmuch as it is no longer necessary to have at hand a former reading, and subtract it from the current reading to determine the measured quantity for the period.

Each meter will presumably still include its own register so that in the event of complaint by the customer, or if there is other desire to check on rare occasions on the remote reading system, a visual reading can be taken at the location of the meter. It would be possible however, to dispense with the register and use only the cumulator, reset motor and impulse sender.

Additional objects and advantages of the invention will be apparent from the following description and from the drawings:

Designation of figures

FIGURE 1 is a schematic drawing of one form of the invention in which the advancing element of the cumulator is driven in reverse to the zero position.

FIGURE 2 is a schematic drawing of another form of the invention, in which the zero or chase element is driven forwardly until it catches up with the advancing element, thereby restoring the cumulator to zero condition.

FIG. 3 represents the central station equipment.

Figure 4:
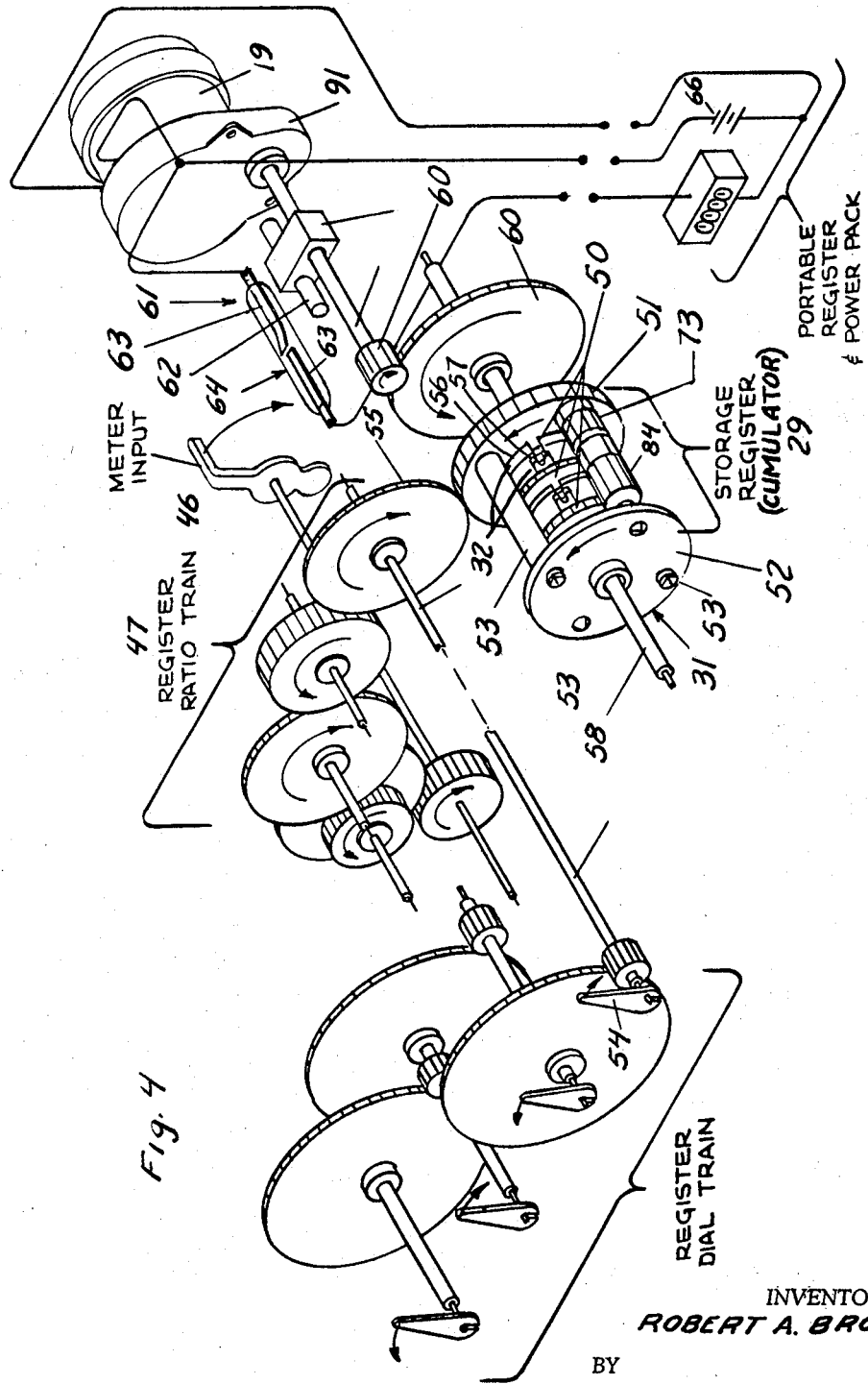
FIG. 4 is an exploded or elongate perspective view of one preferred form of the invention.

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose; as it is these that meet the requirement of pointing out the parts, improvements, or combinations in which the inventive concepts are found.

General description

Basic features common to both illustrated forms of the present invention may be described with reference to FIG. 1. A meter drive element 11, illustrated as a watthour meter disc, drives a register 12. In addition, meter disc 11 drives a lost motion device or a cumulator 13, usually coupled to the units pointer shaft of the register. The cumulator 13 may be said to have an advancing element represented by the section 14, and a zero element represented by section 16, the two sections controlling a contact 17 to open the contact when in the zero position.

The meter disc 11 drives the advancing section 14 forwardly throughout the month or other desired billing period. When a reading is to be taken, a signal is sent from the remote central station, the signal entering the illustrated system over wire 18. Because the initial departure of the cumulator from its zero condition will have allowed contact 17 to close, the signal will be transmitted to reset motor 19, starting the driving of that motor. The motor 19 will restore the cumulator to the zero condition by driving the cumulator in an amount exactly equal to the amount that it has been driven during the billing period by the driving element 11. The amount of this drive will be transmitted to the central remote reading station by a pulse generator 21 over output line 22. Thus, the pulse generator is driven by the reset motor and is designed to send an impulse for each unit of movement of the cumulator as the cumulator is retsored to the zero position by the reset motor. The gearing ratio of the pulse generator to the cumulator is preferably such that the number of pulses transmitted to the central station corresponds exactly to the number of the same kind of measured units as will be the basis of billing by the central station. Thus, in the case of remote reading of an electricity meter, each pulse can conveniently represent one kilowatt hour.

Reverse drive form—FIGURE 1

FIG. 1 represents the cumulator 13 as having the form in which the advancing element is driven in the reverse direction to restore the cumulator to the zero condition. In this form, the zero section 16 may operate a pin 23 which is biased in one direction and which in the other direction opens the contact 17. The contact 17 will therefore be closed all of the time except when the contact 17 has been driven to its zero position by reverse movement of the advancing section 14. With the first unit measured thereafter the contact 17 will be closed, and hence the signal for reading will be transmitted by contact 17 to reset motor 19. The reset motor 19 will thereby be driven and its connection with the advancing section 14 is such as to drive this section in the reverse direction. The amount it needs to be driven in the reverse direction to reach the zero condition is, of course, exactly the amount that it was driven forwardly by the meter driving element 11 since last reset. When the reverse drive of the advancing element 14 has taken up all of the lost motion within the cumulator 13, the zero element 16 will move with the advancing element 14, and upon its very first movement, its pin 23 will open the contact 17, thereby stopping the reset motor 19.

In order to let the reset motor 19 drive the advancing section 14 of cumulator 13 in reverse, there is preferably provided a solenoid clutch 24 in the drive between the meter (11, 12) and the cumulator 13. The solenoid clutch is one which when at rest or de-energized is engaged for transmitting the drive, but is disengaged upon energization by the "signal for reading" over line 18 and through contact 17. Thus, at the same time that the pin 23 opens the contact 17 and stops the reset motor 19, it will also de-energize the solenoid of solenoid clutch 24 and allow the clutch to re-engage.

The reset motor 19 may include its own automatic clutch, so that its driving engagement with both cumulator 13 and pulse generator 21 are terminated when the de-energization of motor 19 ceases. This leaves cumulator 13 free to be advanced by the meter (11, 12) without applying any load except its own negligible friction. The biasing spring 26 is light enough not to be able to move the zero section 16 after the clutch 24 is engaged, since it would then have to overcome the friction in the gear train between the driving element 11 and the pointers of the register 12.

*Chasing reset type—FIGURE 2*

FIG. 2 represents a similar system in which, however, the cumulator is of a different type. In this figure, the advancing section 31 is driven forwardly with the register 12, and a chasing section 32 is, on signal, driven in the advancing direction by the reset motor 19. When the lost motion between the sections 31 and 32 has been taken up, the next immediate further movement will open contact 17. The means of accomplishing this has been diagrammatically represented by a pin 33 which would be moved by chasing section 32 when all of the lost motion has been taken up and which would move along cam 34 to elongate cumulator 29 to thereby open contact 17 regardless of the rotary position of cumulator 29. Cam 34 resists rotation by virtue of the friction in the driving train between meter drive element 11 and pointers of the register 12, there being no solenoid clutch in this form of the invention. Cam 34 is biased by spring 35.

Again, the resetting movement is exactly equal to the driving movement during the billing period. Thus, the amount of movement of the chasing section 32 until the contact 17 is opened, is exactly equal to the amount of movement of the advancing section 31 since the last operation of resetting and meter reading. The amount of this movement is accurately reflected by the number of pulse generator 21 and driven with reset motor 19, and transmitted on output line 22.

Pin 33 and contact 17 could be omitted, if the reset motor 19 is made with a friction clutch or suitable characteristics which will avoid damage when stalled. It would then drive chase section 32 until it caught up with advancing section 31 and then stall, continuing for the short duration of the "signal for a reading" to try in vain to drive chase section 32 (and the impulse sender 21) further.

*Central station equipment*

The preferred central station equipment is represented very diagrammatically in FIG. 3. In a sense the most essential element is the electronic counter 41 for counting the pulses received from the pulse sender 21. All of the rest of the central station functions could be done, in a reasonably phactical sense, by human intervention.

It is preferred, however, that the entire reading operation of many installations be performed jointly with the billing operations by an electronic computer 42. This computer can be somewhat simplified as compared to computers which have been planned heretofore for remote meter reading and billing, which would need the memory capacity for storing each installation's meter reading and comparing a new meter reading with it, subtracting one from the other and billing the customer on the basis of the difference. The control means would, however, include means for sending the signal for a reading to each of the various installations in succession. Either it would include an electronic counter or it would be responsive to one, and would use the electronic count together with identification of the installation derived from the control means or from a coded identification signal from the installation, together with programmed data including rate data for making out the various bills. Of course, if the telephone lines were used for remote meter reading, the control means could dial the various lines in sequence.

*Exemplary installation*

FIG. 4 shows a form of the invention mentioned above in which the chasing reset type is used, with the reset terminated by stalling of the reset motor. In this figure the parts are to a large extent numbered according to numbers used in FIG. 2. And to that extent they are believed to need no further explanation. Dog 46 is a drive coupler which upon application of the mechanism shown in FIG. 4 to the meter would slip into an aperture in a wheel driven by the meter disc through the initial reduction gearing. Gearing 47 is gearing which is part of the register assembly and varies with different requirements to provide the correct ratio between the register and the disc.

Cumulator 29 includes advancing section 31 which in this instance is in the form of a cage formed by gear 51, opposite end plate 52, and spacers 53. This cage is driven by gears 51 and 55 in 1 to 1 ratio with the register indicator 54, which would be the units indicator or the indicator of lowest order.

The chase section 32 is the first stage rotor or couple of the Geneva mechanism, shown with three stages 50. This rotor comprises a notched disc 56 and a forked actuator arm 57. This first stage rotor is fast on shaft 58 which can be driven, through intermediate gearing 60 by the reset motor 19.

The impulse sender comprises a sealed magnetic reed contact device 61 and a magnet 62 rotating adjacent to it to cause mutual attraction of the magnetic reeds 63 within the inert atmosphere sealed within the envelope 64. Instead of a central station system of FIGS. 1 to 3, FIG. 4 represents readout by plugging a portable readout pack into a jack. The jack may be conveniently located even though the meter may not be. The pack includes a battery 66, as well as a counter which could be a printing or recording counter.

*Geneva mechanism*

Figure 5:
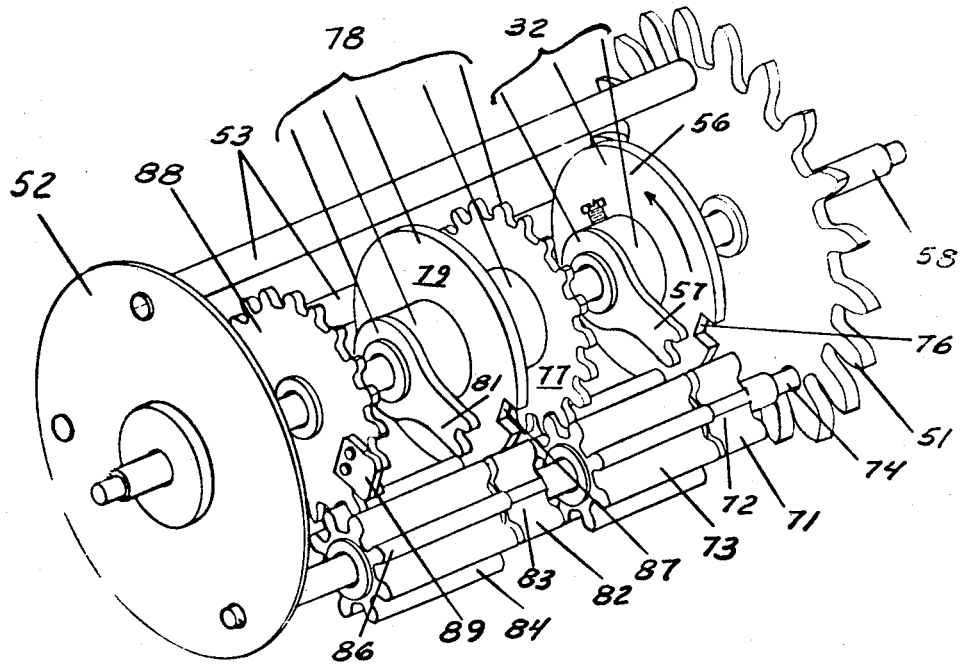
FIG. 5 is a similar enlarged view of the Geneva lost motion device of FIG. 4.

The Geneva mechanism is more clearly seen in FIG. 5. It is, in itself, the subject of another application now pending.

In this explanation it may be easiest to assume that the cage comprising gear 51 and end plate 52 has been advanced, as shown, almost to the end of the available lost motion, and that the reset signal has been given so that motor 19 is about to turn shaft 58. This will turn Geneva rotor 32 in the direction indicated by the arrow, counter-clockwise as viewed. The periphery of disc 56 slides substantially in contact with two of the teeth 71 of a three-tooth pinion which is locked to a six-tooth pinion 73, both being rotatable freely on rod 74 which is part of the rotating cage structure. As couple 32 approximately completes a revolution from the position shown, the actuating fork 57 will strike one of the teeth of pinion 73 on the six-tooth pinion to rotate this pinion with pinion 72. This rotation will be permitted by virtue of the fact that one of the teeth 71 will be received in notch 76. As couple 32 rotates through the bite fork 57 will straddle the second of the teeth of pinion 73 and exit to the position shown having turned pinion 73 through an angularity occupied by two teeth. This then will turn gear 77 of the intermediate Geneva unit 78, that amount corresponding to two teeth. Notched disc 79 and actuating fork 81 are fast with gear 77 and turn accordingly but nothing more happens. The periphery of disc 79 is riding between two of the teeth 82 of the intermediate pinion 83 blocking rotation of this pinion and of the six-tooth pinion 84 locked to three-tooth pinion 83.

For the next few revolutions of couple 32 the same action is repeated, fork 81 progressing around shaft 58. On the tenth revolution of couple 32 from the position shown, however, fork 81 will strike one of the teeth 86 of six-tooth pinion 84 and rotate the unit comprising pinions 84 and 83, this rotation being permitted by the fact that one of the teeth 82 will be received in notch 87 of disc 79.

As fork 57 swings through its bite, fork 81 will swing through its bite to the position shown in FIG. 5 and in doing so will turn pinion 84 through an angularity corresponding to that of two teeth. This in turn will rotate gear 88 through an angularity corresponding to that of two teeth. This entire sequence is repeated over and over. On each tenth revolution of the first stage or rotor 32, the next stage Geneva unit 78 will advance one turn and gear 88, the final stage, will be rotated through an angularity corresponding to two teeth. This action could go on indefinitely, except that a stop 89 is located on the periphery of gear 88 at such a position that when it has made nearly a revolution from the position shown it will block the entry of one of the teeth 86 into gear 88 and hence this rotation will stop. The stop 89 is so located that when it stops the movement the fork 81 is part way through its bite and fork 57 is part way through its bite, so that all relative movement ceases at this point, in other words, the lost motion will have been closed up. Inasmuch as the reducing nature of the gearing between gear 51 and the meter disc prevents a drive of all of the gearing by gear 51, cage 51 and 52 will not rotate and hence shaft 58 cannot rotate further, in view of the locked up condition of the Geneva mechanism. Accordingly, the motor 19 stalls, because of its low torque characteristics. The rotation of magnet 62 about the shaft on which it is carried likewise stops and no more pulses are transmitted to the counter, whether in a portable unit or a central station. As soon as the reading signal or current terminates, the energization of motor 19 is discontinued and the gearing of its gear case 91 prevents rotation by the minute forces applied to the Geneva mechanism to shaft 58. Accordingly, the chase couple 32, fast on shaft 58 will remain stationary while cage 51, 52 begins to rotate in unison with units indicator 54. Thus the lost motion is again accumulated in cumulator or storage register 29.

During this accumulation there will be a similar but opposite step by step Geneva process. Thus the gear 51 will be rotating in a counter clockwise direction and the action will be the same as if the shaft 58 and couple 32 were rotating in the clockwise direction. The very first relative movement will cause the fork 57 to rotate pinions 71 and 73 which will cause the intermediate Geneva unit 78 to rotate enough to move fork 81 out of the bite and stop 89 slightly out of contact with tooth 86. The periphery of disc 79 will at this point come into contact, or substantially into contact, with two of the teeth 82 of three-tooth pinion 83 thereby locking pinions 83 and 84 and gear 88 against further relative rotation, although they will of course continue to revolve with the cage. As the cage 51, 52 accumulates its tenth turn of lost motion, the passage of fork 57 through its bite will cause fork 81 to also pass through its bite, and gear 88 will be turned one tenth of a revolution. This can continue, if the energy consumption by the meter is the maximum for which the equipment is designed, until the parts again reach position shown in FIG. 5.

FIG. 5 represents the approximate maximum of the lost motion which can be accumulated. If gear 51 should rotate a little further, fork 57 would strike one of the teeth of pinion 73 and move into the bite. This would drive the intermediate Geneva unit 78 correspondingly so that fork 81 would enter the bite. Before fork 57 or fork 81 pass through the bite, stop 89 would be struck by one of the teeth 86 and the Geneva mechanism would again be all locked up. Of course, the intention will be never to approach very closely to this locked up condition in the direction of maximum accumulation of lost motion. The amount of lost motion provided in the illustrated unit would be more than enough for virtually any installation, but if more were to be needed it would only be necessary to add a second intermediate Geneva unit 78 between the present unit 78 and gear 88, and ten times as much lost motion would be permitted.

It may be observed that magnet 62 rotates ten revolutions for each revolution of gear 51 and of units pointer 54. Thus since one revolution of the units pointer 54 indicates ten kilowatt hours, the corresponding revolution of shaft 58 to overtake this one revolution of pointer 54 will send ten pulses to be counted at the central station. Accordingly, a hundred turns of lost motion in a cumulator 29 would correspond to one thousand kilowatt hours. If for a very heavy duty use the register included no units pointer, and its lowest order pointer counted tens, then a hundred turns accumulated in accumulator 29 would correspond to ten thousand kilowatt hours.

The Geneva lost motion mechanism 29 and variations of it are capable of many many uses. It is therefore anticipated that this mechanism will be the subject of a separate patent.

Accomplishment

From the foregoing, it is seen that a very simple remote reading system is provided. The heretofore difficult task of accurately determining the position of three or four pointers in sequence and transmitting to the central station a coded set of signals for each indicator position is eliminated. The signals transmitted to the central office are reduced to a simple train of digital pulses which need merely be counted by the equipment at the central office to determine directly the number of units for which charge shall be made.

Great accuracy can be achieved by using a multiturn cumulator so that the advancing element can make one revolution for each revolution of the lowest order indicator of the meter register. The zero point for resetting can be determined with reference to large scale movement, but is nevertheless quite positive and precise because of the locked-up condition of the cumulator at the closing out of the lost motion. A multiple disc type of device such as shown in Swiss Patent 355,518 could theoretically be used, but for most metering would have to be geared down (with less accuracy) or would be much too bulky. Accordingly, an exponential device such as a Geneva type mechanism is virtually essential for dependable accuracy, combined with practical compactness. Its advancing section may rotate 10 times for one rotation of the second section, 100 times for one rotation of the third section, etc. Each section is connected to the next by a Geneva mechanism such as may connect the rotors of a counting register.

With the form shown in FIG. 2, accuracy in achieving the zero condition is not essential. If an impulse should be lost on one reading because of a zero positioning error, it would be picked up on the next reading. Through years of use, the advancing element would be cumulatively advanced. Its total movement would necessarily correspond to total registration by the register 12. The chase or zero element would necessarily, each time it catches up with the advancing element, have moved through the same total distance. There is no chance for cumulative error. This is true of FIGS. 4 and 5 also.

One of the advantages of the present invention is its suitability for both the portable reader system represented in FIG. 4 and the central station system represented by FIG. 3. Although it may prove to be the most practical system for each purpose, its compatability for both permits the meter installations to be made now of meters and cumulator sets for portable reader systems, with hope that the same sets can be used later in central station systems when they come into use.

I claim:

1. A remote meter reading system including a lost motion cumulator having an advancing element and a reference element with lost motion between them limited in the direction of relative approach to one another, means for driving the advancing element in a direction to accumulate lost motion in proportion to the movement of a drive element of a meter, a reset motor connected to drive the cumulator for closing out its lost motion, and a pulse sender driven correlatedly to the reset drive of the cumulator for sending a number of pulses proportional to the amount of the reset drive.

2. A remote meter reading system including a lost motion cumulator having an advancing element and a reference element with lost motion between them limited in the direction of relative approach to one another, means for driving the advancing element in a direction to accumulate lost motion in proportion to the movement of a drive element of a meter, a reset motor connected to drive the reference element in the advancing direction for closing out its lost motion, and a pulse sender driven correlatedly to the reset drive of the cumulator for sending a number of pulses proportional to the amount of the reset drive.

3. A remote meter reading system including a lost motion cumulator having an advancing element and a reference element with lost motion between them limited in the direction of relative approach to one another, means for driving the advancing element in a direction to accumulate lost motion in proportion to the movement of a drive element of a meter, a reset motor connected to drive the advancing element in reverse for closing out its lost motion, and a pulse sender driven correlatedly to the reset drive of the cumulator for sending a number of pulses proportional to the amount of the reset drive.

4. A remote meter reading system including a lost motion cumulator having an advancing element and a reference element with lost motion between them limited in the direction of relative approach to one another, means for driving the advancing element in a direction to accumulate lost motion in proportion to the movement of a drive element of a meter, a reset motor connected to drive the cumulator for closing out its lost motion, and a pulse sender driven correlatedly to the reset drive of the cumulator for sending a number of pulses proportional to the amount of the reset drive;

and means actuated in connection with closing out of the lost motion for discontinuing the reset drive.

5. A remote meter reading system including a lost motion cumulator having an advancing element and a reference element with lost motion between them limited in the direction of relative approach to one another, means for driving the advancing element in direction to accumulate lost motion in proportion to the movement of a drive element of a meter, a reset motor connected to drive the advancing element in reverse for closing out its lost motion and a pulse sender driven correlatedly to the reset drive of the cumulator for sending a number of pulses proportional to the amount of the reset drive;

and switch means actuated by movement of the reference element by the reverse-moving advancing element after closing out of the lost motion for disconnecting the reset drive means.

6. A remote meter reading system including an exponential type of lost motion cumulator having an advancing element and a reference element with lost motion between them limited in the direction of relative approach to one another, means for driving the advancing element in a direction to accumulate lost motion in proportion to the movement of a drive element of a meter, a reset motor connected to drive the cumulator for closing out its lost motion, and a pulse sender driven correlatedly to the reset drive of the cumulator for sending a number of pulses proportional to the amount of the reset drive.

7. A remote meter reading system including a Geneva mechanism type of lost motion cumulator having an advancing element and a reference element with lost motion between them limited in the direction of relative approach to one another, means for driving the advancing element in a direction to accumulate lost motion in proportion to the movement of a drive element of a meter, a reset motor connected to drive the cumulator for closing out its lost motion, and a pulse sender driven correlatedly to the reset drive of the cumulator for sending a number of pulses proportional to the amount of the reset drive.

8. A remote meter reading system including a multistage lost motion cumulator having an advancing element and a reference element with lost motion between them limited in the direction of relative approach to one another, means for driving the advancing element in a direction to accumulate lost motion in proportion to the movement of a drive element of a meter, a reset motor connected to drive the cumulator for closing out its lost motion, and a pulse sender driven correlatedly to the reset drive of the cumulator for sending a number of pulses proportional to the amount of the reset drive.

9. A remote meter reading system including a Geneva mechanism type of multi-stage lost motion cumulator having an advancing element and a reference element with lost motion between them limited in the direction of relative approach to one another, means for driving the advancing element in a direction to accumulate lost motion in proportion to the movement of a drive element of a meter, a reset motor connected to drive the cumulator for closing out its lost motion, and a pulse sender driven correlatedly to the reset drive of the cumulator for sending a number of pulses proportional to the amount of the reset drive;

and means actuated in connection with closing out of the lost motion for discontinuing the reset drive.

10. A remote meter reading system including a lost motion cumulator having an advancing element and a reference element with lost motion between them limited in the direction of relative approach to one another, means for driving the advancing element in a direction to accumulate lost motion in proportion to the movement of a drive element of a meter, a reset motor connected to drive the cumulator for closing out its lost motion, and a pulse sender driven correlatedly to the reset drive of the cumulator for sending a number of pulses proportional to the amount of the reset drive;

and central station equipment including electronic counting means for counting the pulses transmitted from a given meter, and billing means for billing means for billing on the basis of the count independently of prior readings.

11. A remote meter reading system including a lost motion cumulator having an advancing element and a reference element with lost motion between them limited in the direction of relative approach to one another, means for driving the advancing element in a direction to accumulate lost motion in proportion to the movement of a drive element of a meter, a reset motor connected to drive the cumulator for closing out its lost motion, and a pulse sender driven correlatedly to the reset drive of the cumulator for sending a number of pulses proportional to the amount of the reset drive;

and central station equipment including electronic counting means for counting the pulses transmitted from a given meter.

12. A remote meter reading system including a lost motion cumulator having an advancing element and a reference element with lost motion between them limited in the direction of relative approach to one another, means for driving the advancing element in a direction to accumulate lost motion in proportion to the movement of a drive element of a meter, a reset motor connected to drive the cumulator for closing out its lost motion, and a pulse sender driven correlatedly to the reset drive of the cumulator for sending a number of pulses proportional to the amount of the reset drive; and means adapted to be temporarily and briefly associated with the reset motor and sender to actuate the motor and to indicate the total output of the sender.

No references cited.

THOMAS B. HABECKER, *Primary Examiner.*

UNITED STATES PATENT OFFICE
CERTIFICATE OF CORRECTION

Patent No. 3,388,388                                      June 11, 1968

Robert A. Brown

It is certified that error appears in the above identified patent and that said Letters Patent are hereby corrected as shown below:

Column 3, line 54, after "of" insert -- pulses produced by --; line 72, "phactical" should read -- practical --. Column 5, line 2, after "bite" insert a comma. Column 8, lines 61 and 62, cancel "for billing means".

Signed and sealed this 16th day of December 1969.

(SEAL)
Attest:

Edward M. Fletcher, Jr.
Attesting Officer

WILLIAM E. SCHUYLER, JR.
Commissioner of Patents